(12) United States Patent
Kim et al.

(10) Patent No.: US 12,205,487 B2
(45) Date of Patent: Jan. 21, 2025

(54) ROBOT CONTROL SYSTEM FOR CODING EDUCATION

(71) Applicant: Industry-Academia Cooperation Foundation, Sejong campus, Hongik University, Sejong (KR)

(72) Inventors: Na-young Kim, Seoul (KR); Beom-joo Seo, Sejong (KR)

( * ) Notice: Subject to any disclaimer, the term of this patent is extended or adjusted under 35 U.S.C. 154(b) by 485 days.

(21) Appl. No.: 17/567,096

(22) Filed: Dec. 31, 2021

(65) Prior Publication Data

US 2022/0223065 A1   Jul. 14, 2022

(30) Foreign Application Priority Data

Dec. 31, 2020   (KR) .......................... 10-2020-0188998

(51) Int. Cl.
*G09B 19/00* (2006.01)
*B25J 9/16* (2006.01)
*B25J 11/00* (2006.01)

(52) U.S. Cl.
CPC .......... *G09B 19/0053* (2013.01); *B25J 9/162* (2013.01); *B25J 11/00* (2013.01)

(58) Field of Classification Search
CPC ......... G09B 19/0053; B25J 9/16; B25J 9/162; B25J 11/00
See application file for complete search history.

(56) References Cited

U.S. PATENT DOCUMENTS

| | | | |
|---|---|---|---|
| 2021/0077915 A1* | 3/2021 | Blaustein | A63H 30/04 |
| 2021/0110735 A1* | 4/2021 | Nagasaka | G09B 19/0053 |

* cited by examiner

*Primary Examiner* — Timothy A Musselman

(57) ABSTRACT

A robot control system for coding education may include: a robot configured to move according to a tangible block including a command, and having a plurality of motors therein; a control unit configured to independently control the plurality of motors; and a tile board corresponding to the space in which the robot moves. The control unit may include a line detection unit configured to detect a line of the tile board in order to check whether the robot moves according to the tangible block. The line detection unit may include line information which is configured in a different manner depending on whether the line is present within a detection radius of the line detection unit. The order information of the tangible block may be read by a block recognition algorithm, and the block recognition algorithm may map the tangible block placed on a 3D space to a 2D space.

6 Claims, 15 Drawing Sheets

【FIG. 1】
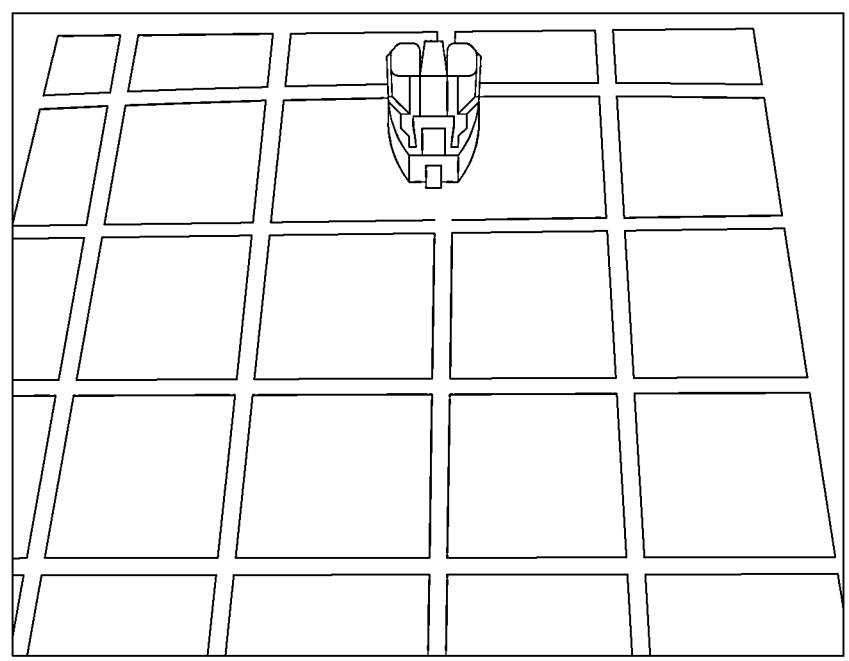

[FIG.2]
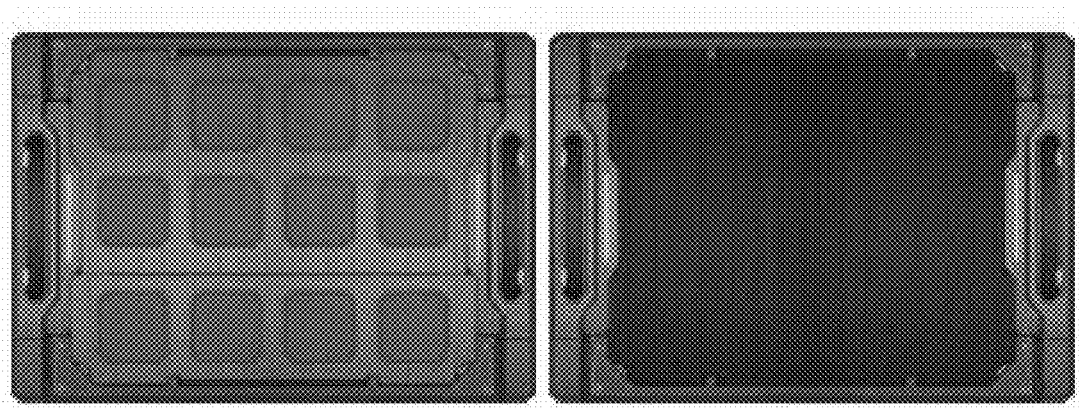
<Command Board>
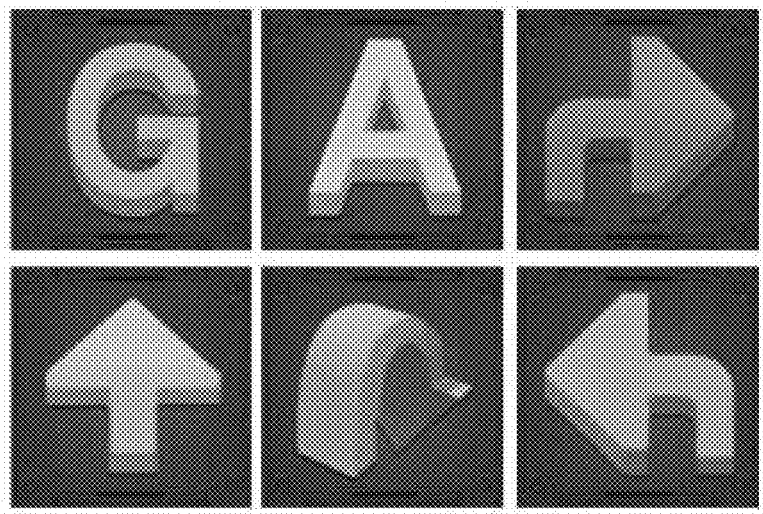
<Command Chip>

[FIG. 3]
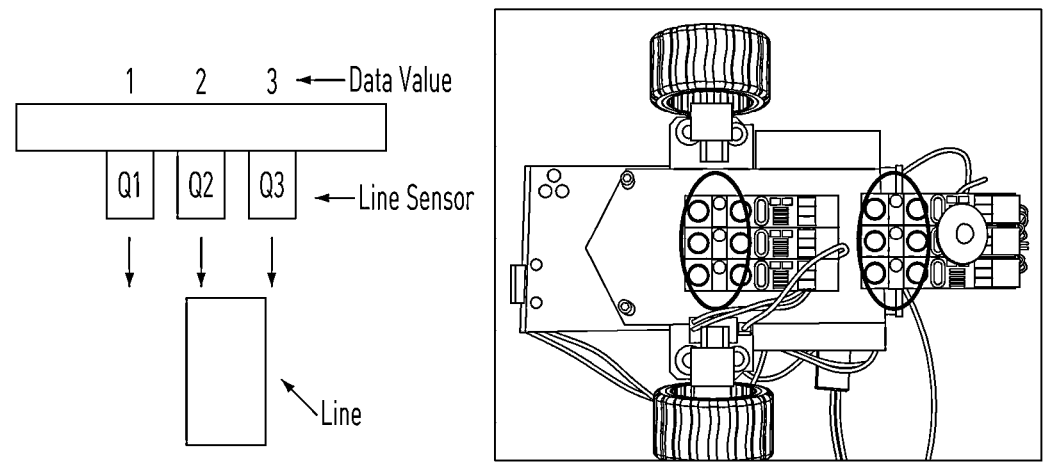

[FIG.4]
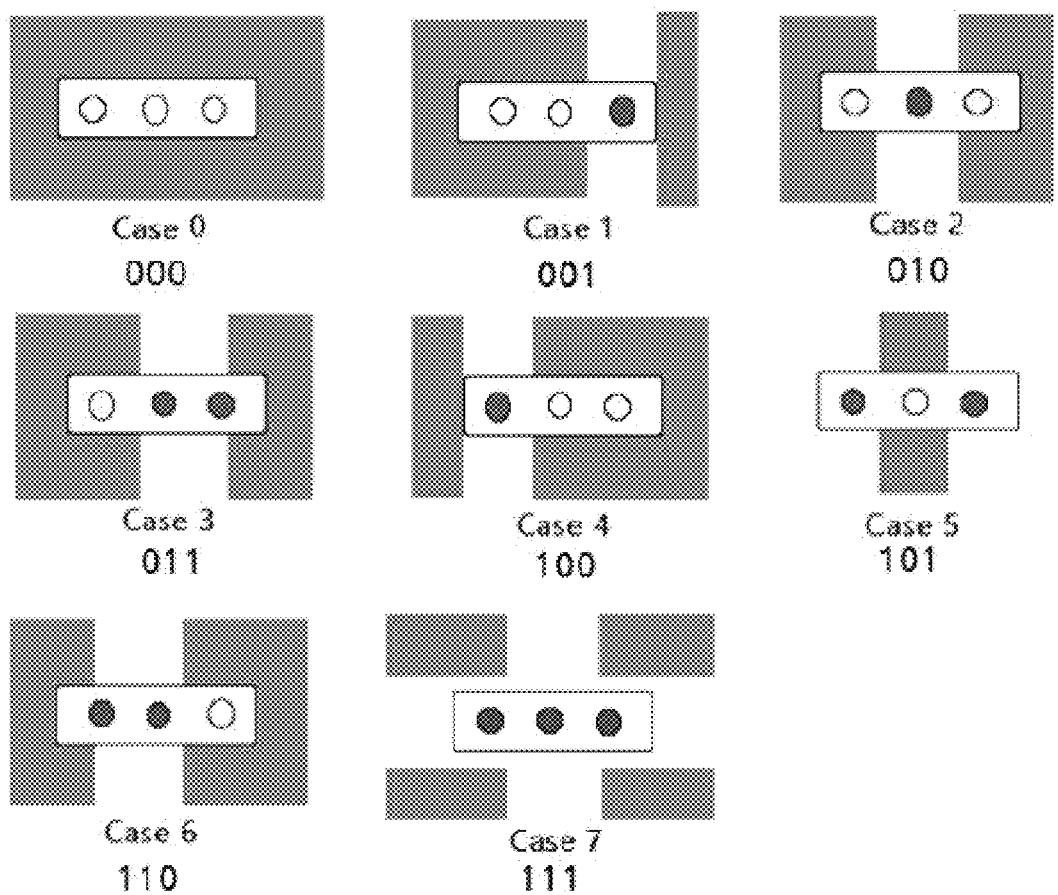

[FIG.5]
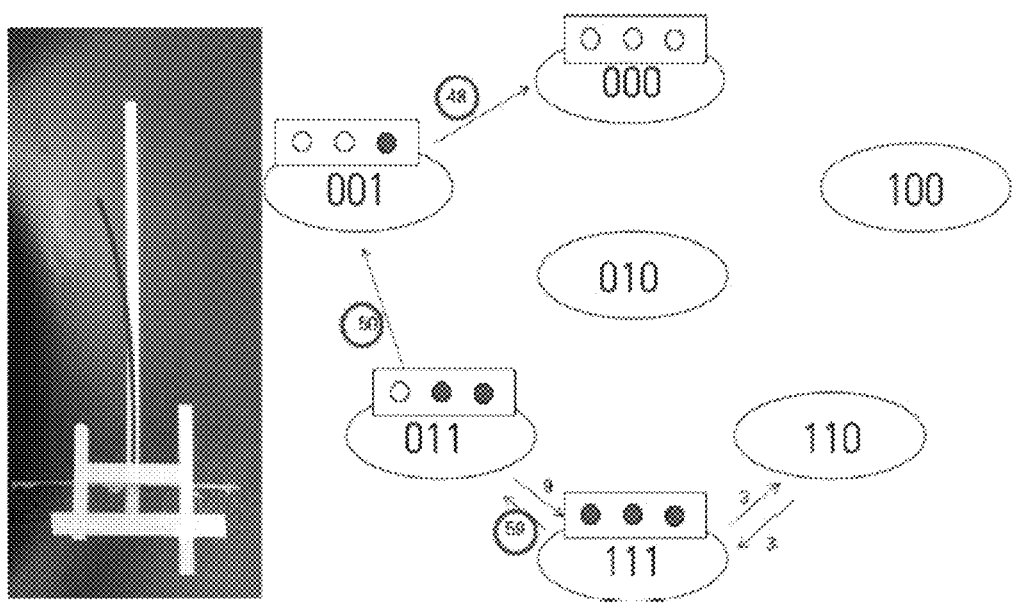

[FIG.6]
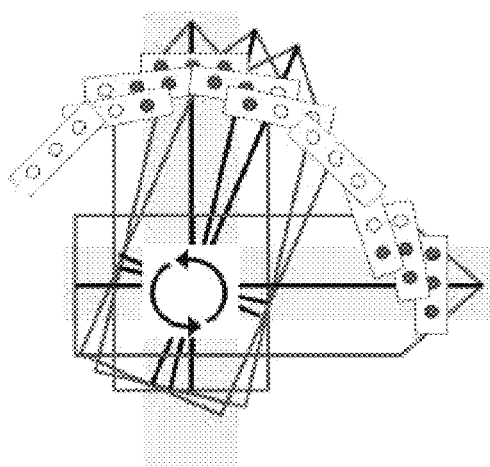

[FIG.7]
  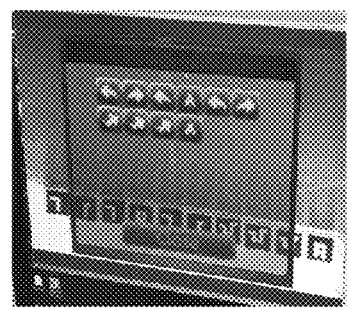
(a) Before   (b) Recognizing   (c) After

[FIG.8]
<Tile Arrangement>
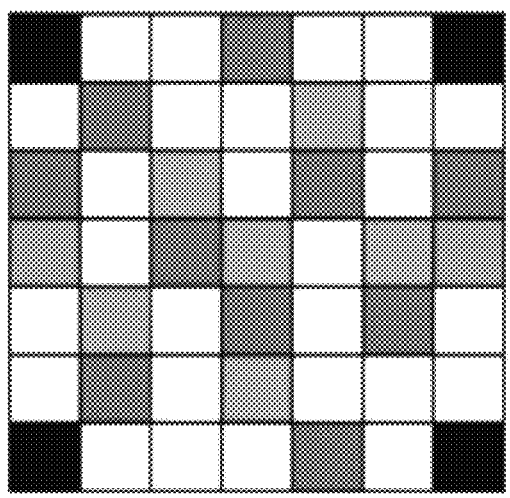
■ – Start Point
▨ – Warp Tile
▨ – Contaminated Tile
▨ – Obstacle Tile
<Tile Arrangement Example>

[FIG.9]
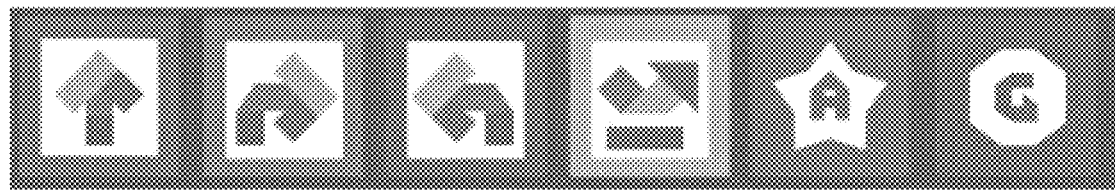

[FIG. 10]
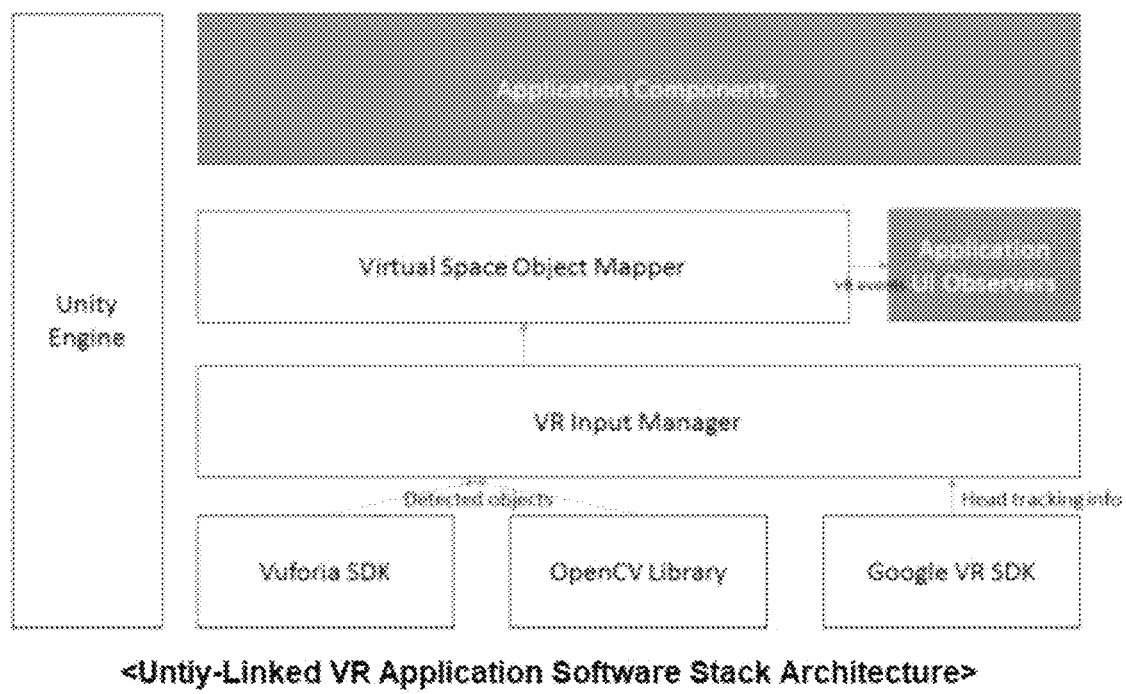
<Unity-Linked VR Application Software Stack Architecture>

[FIG. 11]
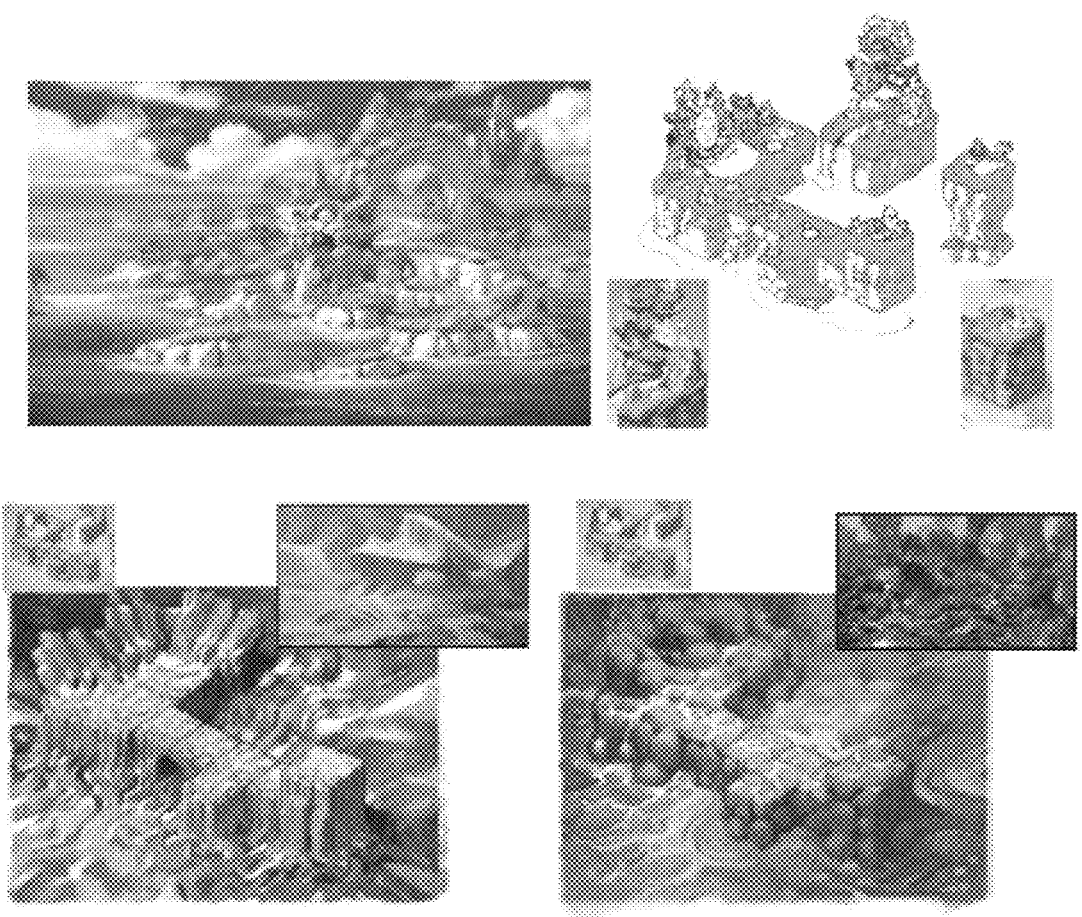

[FIG. 12]
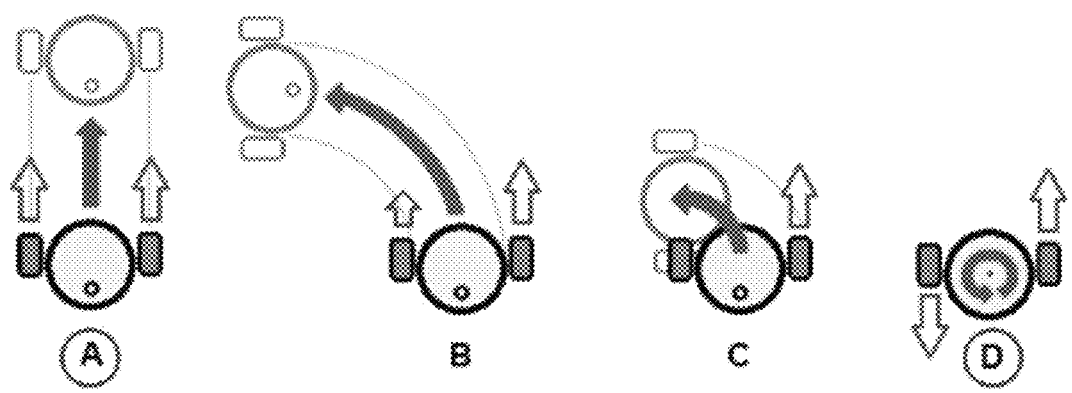

[FIG. 13]
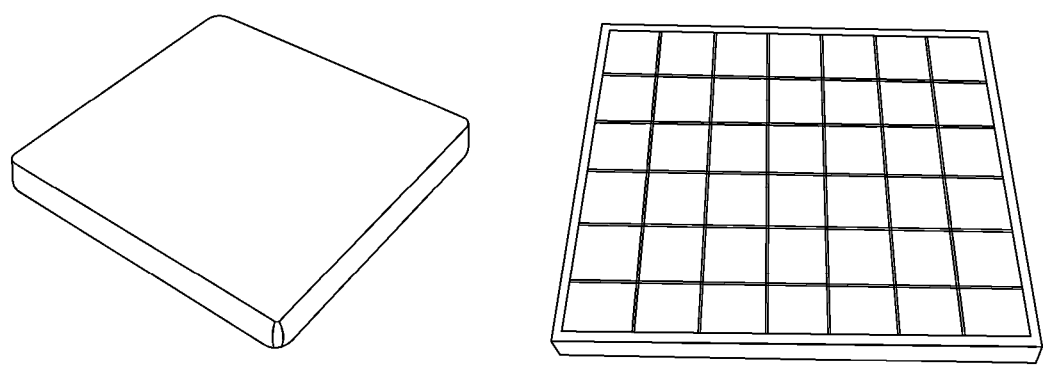
<Tangible Block Output Test>

[FIG.14]
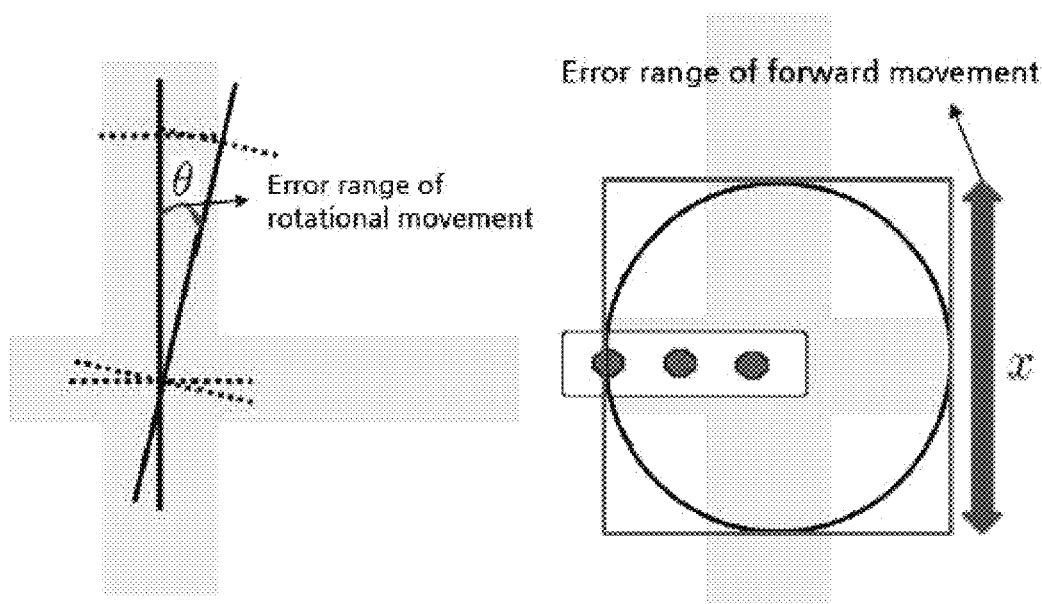

[FIG. 15]
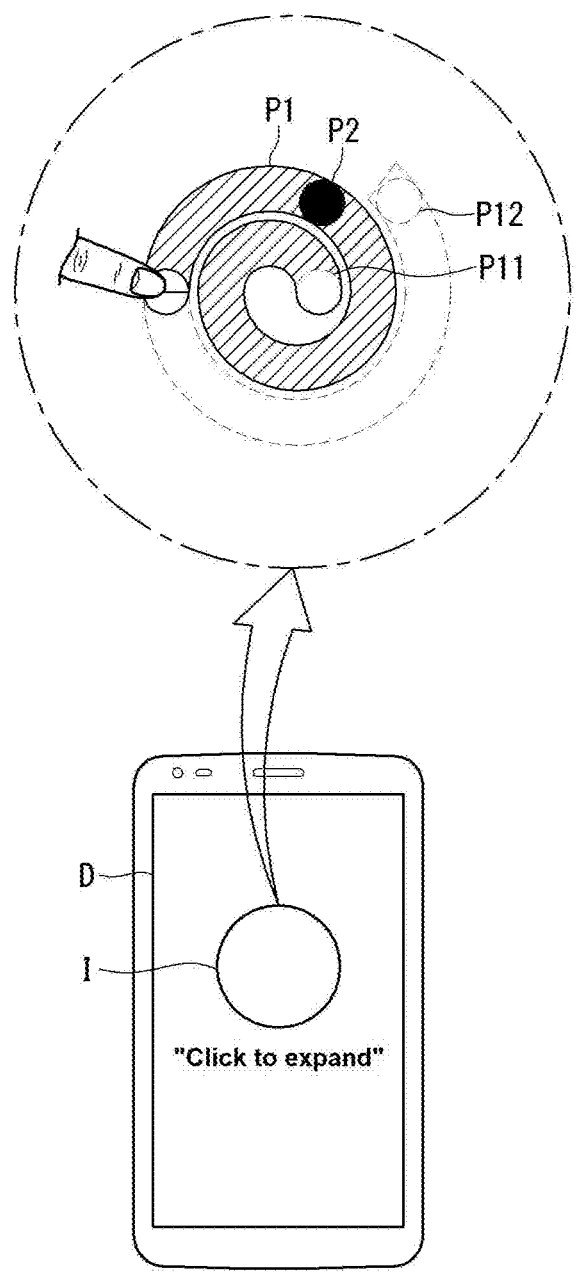

ROBOT CONTROL SYSTEM FOR CODING EDUCATION

BACKGROUND

1. Technical Field

The present disclosure relates to a robot control system for coding education, and more particularly, to a robot control system for coding education, which accurately controls a robot for coding education through a line detection unit capable of detecting a line, thereby increasing the utilization of the robot in the coding learning tool market.

2. Related Art

In the age of the fourth industrial revolution, the importance of coding education is emphasized, and there is a need for a learning tool which can induce kindergarteners and low age students under third grade to develop computing thoughts, and enable the kindergarteners and low age students to learn coding as they play games at home.

The related art of this learning tool is disclosed in Korean Patent No. 10-1843831 entitled "Unplugged Real Coding Block". The unplugged real coding block according to the related art includes: at least one real coding block having a unique ID embedded therein, including one or more connectors, and configured to generate a real code; at least one numbering block having a unique ID embedded therein, connected to the real coding block, and configured to receive a numerical value; at least one variable block having a unique ID embedded therein, connected to the real coding block, and configured to receive a variable value; and a main block connected to the real coding block, and configured to sequentially execute codes corresponding to IDs received from the real coding block. The unplugged real coding block according to the related art may provide a block having a similar structure to a real coding statement (control statement, variable, event, debugging or the like), and the provided block may create excitement, help students to learn the concept of coding, and reinforce the connection with a real coding statement.

However, the related art does not specifically disclose a control system of an execution device 500 which executes a predetermined operation according to a control signal of the main block. Thus, when an inaccurate motion of a control target often occurs, the unplugged real coding block has no unit capable of controlling the control target. Therefore, the unplugged real coding block is not used as a coding education tool, but used as only a toy.

SUMMARY

Various embodiments are directed to a robot control system which includes a method for correcting forward movement and rotation movement of a robot (command target), and thus can accurately control the robot when an incorrect movement of the robot occurred, thereby enabling low age learners to effectively receive coding education.

Also, various embodiments are directed to a robot control system which can raise the recognition rate of a tangible block including a command, such that various educations can be smoothly performed in a mobile application operation environment.

In an embodiment, a robot control system for coding education may include: a robot configured to move according to a tangible block including a command, and having a plurality of motors therein; a control unit configured to independently control the plurality of motors; a tile board corresponding to the space in which the robot moves; and a block recognition unit configured to recognize the tangible block and extract the command. The block recognition unit may include a block recognition algorithm for reading order information in which the tangible block is placed, and the block recognition algorithm may map the tangible block placed on a 3D space to a 2D space.

The block recognition algorithm may include: an image acquisition step of acquiring an image of the tangible block; a storage step of storing the image acquired in the image acquisition step; a 2D information extraction step of extracting 2D information of the stored image; a coordinate setting step of setting an orientation coordinate and setting a coordinate in the 2D information based on the orientation coordinate; an order information acquisition step of acquiring the order information according to the set coordinate; and a placement step of placing the tangible block on an AR (Augmented Reality) environment according to the order information.

The block recognition algorithm may further include an allocation step of allocating not-placed blocks after the placement step, when the not-placed blocks are present.

The allocation step may include an average height calculation step of calculating the average height of the tangible blocks and a sorting step of sorting subaverage blocks having a smaller height than the average height, among the non-placed blocks.

The command block may have an OpenCV-based marker on the top surface thereof, and the block recognition unit may include a corner recognition module configured to recognize a corner of the marker.

The control unit may include a line detection unit configured to detect a line of the tile board in order to check whether the robot moves according to the tangible block, and the line detection unit may include line information which is configured in a different manner depending on whether the line is present within a detection radius of the line detection unit.

The error ranges of forward movement and rotational movement of the robot satisfy the following equations: Ed=length of line detection unit×2 and Eθ=arctan ((line width/2)/distance difference between front line detection unit and center line detection unit)), where Ed represents the error range of the forward movement, and Eθ represents the error range of the rotational movement.

In accordance with the embodiment of the present disclosure, the robot control system may include the method for correcting forward movement and rotation movement of a robot (command target), and thus can accurately control the robot when an incorrect movement of the robot occurred, thereby enabling low age learners to effectively receive coding education.

Also, the robot control system can raise the recognition rate of the tangible block including a command, such that various educations can be smoothly performed in a mobile application operation environment.

BRIEF DESCRIPTION OF THE DRAWINGS

FIG. 1 is a group of images showing a robot, a tile board and a command board, which are used for a robot control system for coding education in accordance with an embodiment of the present disclosure.

FIG. 2 is an image and diagram showing a command board and a command chip, respectively.

FIG. 3 is a diagram and photograph showing a line detection unit and a liner sensor.

FIGS. 4 and 5 are diagrams showing line information.

FIG. 6 is a diagram illustrating line information which is changed during rotational movement.

FIGS. 7A to 7C are photographs showing a process of recognizing a marker.

FIG. 8 is a diagram illustrating a tile board.

FIG. 9 is a diagram showing a marker expressed as a pictogram.

FIG. 10 is a block diagram illustrating the architecture of a software stack.

FIG. 11 is a group of images showing background screens placed on a VR-linked user interface.

FIG. 12 is a diagram illustrating movements of a robot.

FIG. 13 is a photograph illustrating a tangible block.

FIG. 14 is a diagram illustrating the error ranges of forward movement and rotational movement.

FIG. 15 is a diagram showing an access code.

DETAILED DESCRIPTION

The present disclosure may be modified in various manners and have various embodiments. Thus, aspects or embodiments of the present disclosure will be described in detail in the detailed description of the present disclosure. However, the aspects or embodiments of the present disclosure do not intend to limit the present disclosure to specific embodiments, and it should be understood that the present disclosure includes all modifications, equivalents and substitutions without departing from the sprit and scope of the present disclosure.

The terms used in this specification are used only to describe a specific aspect or embodiment, and do not intend to limit the present disclosure. The terms of a singular form may include plural forms unless clearly referred to the contrary. In this specification, the meaning of "include" or "composed of" specifies the existence of a property, a number, a step, an operation, an element, a component, or combinations thereof, but does not exclude the existence or addition possibility of one or more other properties, numbers, steps, operations, elements, components, or combinations thereof.

All terms used herein, which include technical or scientific terms, have the same meanings as those generally understood by those skilled in the art to which the present disclosure pertains, unless differently defined. The terms defined in a generally used dictionary should be construed to have meanings which coincide with contextual meanings in the related art. Unless clearly defined in this specification, the terms should not be construed as ideal or excessively formal meanings.

In the present disclosure, the terms such as first and second are only used to distinguish between different components, and are used regardless of the order in which the components are manufactured. The names of the components in the detailed descriptions may not coincide with those in the claims.

The present disclosure relates to a robot control system for coding education, and more particularly, to a robot control system for coding education, which accurately controls a robot for coding education through a line detection unit capable of detecting a line, thereby increasing the utilization of the robot in the coding learning tool market.

The robot control system includes a robot configured to move according to a command included in a tangible block, and including a plurality of motors therein.

First, the robot will be described with reference to FIG. 1. As illustrated in FIG. 1, an Arduino robot as hardware operates like a game piece on a board. The robot performs a forward movement function and a rotational movement function along a tile line. The robot includes a base frame configured to contain components of the robot and an exterior frame configured to cover the base frame. The exterior frame is designed to contain various robot models, outputted through a 3D printer, in the base frame. The entire size of the robot corresponds to ½ of the size of a board game tile. Furthermore, the robot employs a lithium battery which can be charged so that the robot is driven without an external power supply, and can be easily reduced in size. As the Arduino robot which is well used at the moment, Arduino Uno as a base model is used. The Arduino robot includes two wheels located in the center thereof and an auxiliary wheel located at the front surfaces of the two wheels, and the two wheels each have a motor for the movement function.

As shown in FIG. 2, the commands may be composed of five commands including a forward command, a right rotation command, a left rotation command, a jump command and an action command. According to the forward command, a robot moves one square forward over tiles on the basis of the current time point of the robot. The two rotation commands refer to commands for rotating the robot to the left and right, respectively. The action command refers to a command for purifying a contaminated tile or clearing a mission or instantly moving the robot by using a warp tile, when a front tile in a direction seen by the robot is the contaminated tile or the tile at which the robot is currently located is the warp tile. When a given mission is cleared, a beep sound may be additionally provided to notify that the mission is cleared. The jump command refers to a command for making the robot jump.

In addition to the above-described commands, a group command may also be provided to execute a plurality of commands, placed at the bottom of the command board through which the commands are inputted, by the number of group commands.

The command board is composed of a command board top and a command board bottom, and the command board top and the command board bottom are divided on the basis of a boundary located in the center of the command board. As described above, the command board bottom corresponds to the space to which a command to be used as the group command is inputted.

In addition to the above-described commands, a command which is frequently used may be stored in the form of a function and then fetched and used. The command is referred to as a function command.

When a user inputs such a command to a command input queue, a control unit may transfer the command to the robot.

The above-described robot is configured as an Arduino-based device capable of providing stable movement. In order to clear a given mission, a plurality of commands set to a command group are contained in a command queue, and sequentially transmitted through communication with a communication unit of the Arduino-based device, thereby controlling the robot. Thus, a command scheduler serves to fetch the input commands one by one from the command queue, transfer the fetched commands to the robot through a wireless communication unit with a transmitter, and instruct the robot to perform operations according to the various commands. When the commands are completely executed, the command scheduler sequentially fetches the next commands contained in the command queue, and finishes all the commands remaining in the command queue.

The robot control system in accordance with the present disclosure may be implemented on a mobile application for coding education. Furthermore, the robot control system is based on the Unity3D game platform.

The command scheduler and the robot operate in a client/server manner through a wireless network, and the command scheduler serves as a client. In reality, an Arduino device controls a plurality of sensors to execute one command. Therefore, in order to coordinate the plurality of sensors, the command scheduler and the robot operate as a client/server model through the wireless communication unit.

In the present disclosure, Bluetooth which can be easily utilized with small power consumption in a limited interior space is employed among various communication methods. Bluetooth 4.0 or more may be used to cope with all representative mobile environments (iOS and Android).

Furthermore, an Arduino Bluetooth receiver module serving as a server receives commands according to a serial connection method, and executes commands one by one and returns performance results to the transmitter, according to a synchronous method.

The control unit may independently control the motors, and correct the movement of the robot such as rotational movement or backward movement.

Specifically, when the robot is to be rotated to the left as illustrated in FIG. 12, the control unit lowers the rotation speed of the left wheel, and raises the rotation speed of the right wheel, thereby implementing the rotational movement to the left. Furthermore, when the robot is to be rotated to the right, the control unit raises the rotation speed of the left wheel, and lowers the rotation speed of the right wheel, thereby implementing the rotational movement to the left. Similarly, when the robot is to be moved backward, the control unit may control the speeds of the wheels to implement the backward movement. When the movement of the robot is to be corrected or specifically when the movement of the robot is biased to the left, the rotation speed of the left wheel is raised to a higher speed than the rotation speed of the right wheel, such that the direction of the movement is corrected to the normal direction. Furthermore, when the movement of the robot is biased to the right, the rotation speed of the right wheel is raised to a higher speed than the rotation speed of the left wheel, such that the direction of the movement is corrected to the normal direction.

The motor control is performed as follows: an Arduino basic voltage of 5V is linearly mapped to an integer output value of 0 to 255 through PWM (Pulse Width Modulation) in each duty cycle, in order to control the movement of each motor.

Furthermore, an H-bridge circuit which changes a current direction in a hardware manner is used for forward rotation or reverse rotation of the motor, and controls the forward, backward and left/right rotational movements according to signal settings.

In order to search for and verify the occurrence factors of phenomena which occur during movement, the following method may be used.

The robot includes a line detection unit configured to measure the RPM of the motor in real time through an encoder and an optical sensor, which are attached thereto, and detect a line of a tile board. Thus, the robot may detect whether the robot accurately moves along a line of the tile board. As a specific embodiment of the line detection unit, an infrared line tracking sensor (hereafter, simply referred to as a line sensor) may be used.

The line sensor emits infrared light to the floor, receives light reflected from the floor, and calculates the intensity of the received light. The line sensor determines that a line is present, when the calculated result value is equal to or more than a predetermined value, and determines that no line is present, when the calculated result value is less than the predetermined value, in order to check whether a line is present on the movement path.

As illustrated in FIG. 3, a center line detection unit disposed in the center of the robot includes three line sensors to recognize a location at which lines cross each other, when the robot moves forward from one tile to another tile, and a front line detection unit additionally disposed at the front of the robot includes three line sensors to detect whether a measurable line is present at each 90 degrees during rotational movement.

Furthermore, as illustrated in FIG. 4, three line sensors set to one unit have a total of 8 pieces of state information, and are used to estimate the movement condition and the current progress situation of the robot. For example when the three line sensors located in the center has state information of 111, it may indicate that the robot is located at the intersection between tiles just before moving from the current tile to another tile.

That is, the line detection unit includes line information which is configured in a different manner depending on whether the line is present within the detection radius of the line detection unit. The line detection unit has a detection radius corresponding to a typical detection radius of an infrared sensor.

Furthermore, a forward command for moving the robot forward is executed on the basis of the line information detected by the center line detection unit, and a rotation command for rotating the robot is executed on the basis of the line information detected by the front line detection unit.

As illustrated in FIG. 4, such line information includes first line information 000 indicating that no line is detected, second line information 001 indicating that a line is detected only from the right side, third line information 010 indicating that a line is detected only from the center, fourth line information 011 indicating that lines are detected from the center and the right side, fifth line information 100 indicating that a line is detected only from the left side, sixth line information 101 indicating that lines are detected from the left and right sides, seventh line information 110 indicating that lines are detected from the left side and the center, and eighth line information 111 indicating that lines are all detected from the left side, the center and the right side.

In a specific embodiment, as illustrated in FIG. 5, the line information is sequentially changed to 111, 011 and 001 while the robot is moved forward a total of 50 times, which shows that the robot slowly moves to the left from an orientation location.

The third line information 010 corresponding to a phantom state is analyzed as appearing due to sensor noise. The analysis for all cases in which the corresponding state occurred shows that the third line information 010 may be determined to be the same state as the previous state.

In the case of rotational movement, the three line sensors located in the center cannot evaluate the rotation state as shown in FIG. 6. Thus, the three line sensors are provided on the front surface of the robot.

As shown in FIG. 14, the error ranges of the forward movement and the rotational movement of the robot satisfy Ed and Eθ, where Ed=length of line detection unit×2 and Eθ=arctan ((line width/2)/distance difference between front line detection unit and center line detection unit)). Here, Ed represents the error range of the forward movement, and Eθ represents the error range of the rotational movement.

Hereafter, a block recognition unit configured to recognize the tangible block will be described in detail.

The block recognition unit serves to recognize the tangible block such that the tangible block can be augmented on an AR environment. As a specific embodiment, a recognition system using OpenCV may be exemplified. In the OpenCV, however, the input order of the tangible block is not recognized. Thus, in the present disclosure, the order information of the tangible block may be acquired through an independent block recognition algorithm.

The recognition system using the OpenCV refers to a system that uses a method for recognizing a marker through a template matching and image recognition technique.

That is, the block recognition algorithm is an algorithm for acquiring the order information of the tangible block. More specifically, the order information of commands included in a marker attached to the top surface of the tangible block may be acquired in order to transfer the commands to the robot according to the order in which the commands are inputted.

The commands may indicate the above-described commands, and the communication method may be performed as described above.

The block recognition algorithm includes an image acquisition step of acquiring an image of the tangible block, a storage step of storing the image acquired in the image acquisition step, a 2D information extraction step of extracting 2D information of the stored image, a coordinate setting step of setting an orientation coordinate, and setting a coordinate for the 2D information on the basis of the orientation coordinate, an order information acquisition step of acquiring the order information according to the set coordinate, and a placement step of placing the tangible block on the AR environment according to the order information.

Here, a feature of the block recognition algorithm is to map 3D information stored in the marker in order to extract the 2D information. The mapping may be also performed through the above-described OpenCV. A mobile device has four different directions or orientations, and thus includes a landscape screen, a portrait screen, a flipped landscape screen and a flipped portrait screen. Thus, the orientation coordinate may be set to different values for the respective directions or orientations. Therefore, when the orientation coordinate is set, it indicates that the coordinate system is converted into a 2D coordinate system in which a top left corner adopted in DirectX on the basis of the landscape screen is set to a screen origin (0, 0), such that the same algorithm can be applied.

The block recognition algorithm further includes an allocation step of allocating not-placed blocks after the placement step, when the not-placed blocks are present. The allocation step includes an average height calculation step of calculating the average height of the tangible blocks and a sorting step of sorting subaverage blocks having a smaller height than the average height, among the non-placed blocks.

Thus, a result obtained by sorting all the subaverage blocks in ascending order of x values is stored in a result list, and this process is repeated until no markers remain, in order to place all the markers.

The tangible block is configured as a square plastic model outputted through a 3D printer, and ArUco markers which can be attached in the form of a sticker are attached to the top surface of the tangible block. The marker includes the above-described commands.

Since the marker has a binary pattern or shape therein and corners whose 3D coordinates are known, an object may be easily recognized through simple image processing.

Block recognition software corresponds to a recognition test program developed through the OpenCV for Unity library in the Unity environment. FIGS. 7A to 7C show a result obtained by placing tangible blocks, which are to be tested before measurement, in a direction perpendicular to a recognition camera, checking currently recognized commands during recognition, and expressing markers, which have recognized the check results in the placement order on the screen, in the form of icons.

Next, the tile board corresponding to the space in which the robot moves will be described as follows. As shown in FIG. 8, the tile board includes a general tile, an obstacle tile, a contaminated tile and a warp tile. The general tile corresponds to a basic tile which has no function such that the robot can pass the basic tile. The obstacle tile has a height such that the robot can move over the obstacle tile by using the jump command. The contaminated tile corresponds to a tile which has been contaminated so that the robot cannot step on the tile. While the robot stays square to the contaminated tile, the robot needs to purify the contaminated tile into a general tile by using an action command, in order to move to the contaminated tile. The warp tile corresponds to a tile through which the robot can end a game or instantly move, when using the action command.

Next, the tangible block including a command and a marker in which a 3D location is stored will be described as follows.

When a learner actually places the tangible blocks, objects (the tangible blocks) may be augmented on an AR environment through recognition of the block recognition unit, and information on the objects may be transferred to the robot such that the robot can be controlled according to the content and input order of the commands. The method in which the commands are transmitted and received has been already described above in detail. The tangible block may also be described with reference to FIG.

As illustrated in FIG. 9, the tangible block has a color variation of a white background having high brightness and a pictogram having low brightness, and thus reinforces pattern recognition through the brightness difference, thereby having a high recognition rate.

Therefore, the tangible block may be used as a coding education tool using a robot, which is targeted to relatively low age learners. Furthermore, since the robot control system in accordance with the present disclosure accurately controls the robot, the robot control system can be actively utilized as a coding education tool.

For a VR-linked application using the block recognition system, a separate link software stack is required for each development platform. In the present disclosure, the link software stack includes a VR software stack for implementing a GooGle VR-linked application, a VR software stack for implementing a Vuforia-linked application, and a VR software stack for implementing an OpenCV-linked application.

As illustrated in FIG. 10, the software stack is configured in such a form that can utilize AR/VR devices, and constructed in the form of a prefab which can be used in the Unity engine. Such a software stack has an SDK library plugged therein.

Furthermore, a UI (User Interface) of a VR-linked application needs to be designed as a UI which can be used without a conventional physical input device (mouse or keyboard). At this time, a head tracking technology using a gyroscope may be employed for a user's gaze movement.

Such a UI is configured not to display a reference point for the center direction of the user's gaze as it is, but to distinguish the closest object to the reference point and highlight the corresponding object on the screen.

Through the VR software stack, an AR-based task execution game system may be implemented and utilized as an AR coding education book.

FIG. 11 is a group of images showing background screens of the application, which low age students may like.

In addition, the coding education block recognition system may further include a reward providing unit which corresponds to a function unit configured to provide a reward to a learner who has completed a scheduled curriculum or cleared a mission.

A learner who has completed a certain level of curriculum may acquire unlocked character information on the basis of the completion information, select a character, and use the selected character as a new character in a game. A first user is provided with at least one available character regardless of whether the character is unlocked.

According to the unlocking condition, a user who can unlock a character is limited to a user such as a general learner or teacher, who has been normally registered, and unlocks a character associated with a specific stage when the specific stage is ended. When a specific stage is ended, a character associated with the stage is unlocked.

The game refers to a puzzle game which enables a learner to place tangible blocks on an AR environment and to learn the basic content of coding.

Hereafter, an evaluation result unit access interface (hereafter, an access code generation unit or access code input unit) will be described as follows. As group education for coding education is actively conducted, the access code generation unit or access code input unit can notify evaluation result information on learning content only to an evaluation target learner, and enable the learner to intuitively check an evaluation grade based on the evaluation result.

The access code generation unit or access code input unit may prevent unintended authentication through unintended access, and thus prevent random access to an evaluation result unit. Furthermore, the present disclosure is particularly related to the evaluation of the coding education for low age learners. As an authentication path P1 is configured in the shape of the fingerprint of an evaluation target learner, the present disclosure enables the low age learners to recognize the importance of a fingerprint as an authentication method.

First, the block recognition system further includes the evaluation result unit including information on an evaluation result of a coding education learner, and the evaluation result unit includes the access code generation unit configured to generate an access code I for access to the evaluation result unit.

The access code I generated by the access code generation unit may be managed by a server. Since the generated access code I is different for each client, the server individually transmits the access code I to each client. That is, the access code I may be individually transmitted to the client of the evaluation target learner, and an access code input unit D receiving the access code may decode the access code I to connect the client to the evaluation result unit.

The reason to individually transmit the access code I is in order to allow learners not to know the grades of each other.

FIG. shows the access code I appearing on the access code input unit D.

The access code I includes an authentication path P1 and an authentication point 2. The authentication path P1 is configured in the shape of the fingerprint of an evaluation target learner, and composed of a start point P11 set to the lowest grade of another learner and an end point P12 set to the highest grade of the another learner, and the authentication point P2 is formed at any one location of the authentication path P1.

The fingerprint shape refers to the fingerprint shape of each learner. Since the another learner and the evaluation target learner have different fingerprint shapes, the authentication path P1 of the another learner and the authentication path P1 of the evaluation target learner are also differently formed.

The authentication path P1 has a total length corresponding to a value obtained by subtracting the lowest grade of any one learner from the highest grade of the any one learner. For example, when the highest grade and the lowest grade are significantly different from each other, the total length of the authentication path P1 is increased.

When the start point P11 of the authentication path P1 is set to the lowest grade of another learner and the end point P12 of the authentication path P1 is set to the highest grade of the another learner, it indicates that the start point P11 at which a drag operation is started is formed at a point corresponding to the lowest grade of the another learner, and the end point P12 at which the drag operation is ended is formed at a point corresponding to the highest grade of the another learner.

The any one location is formed close to the start point P11 when the current grade of the evaluation target learner is close to the lowest grade, and formed close to the end point P12 when the current grade of the evaluation target learner is close to the highest grade.

That is, the any one location at which the authentication point P2 is formed refers to a location away from the start point P11 by a length corresponding to a value obtained by multiplying the total length of the authentication path P1 by the ratio of the current grade to the lowest grade with respect to the difference between the highest grade and the lowest grade.

For example, when the highest grade of the another learner is 80, the lowest grade of the another learner is 20, and the current grade of the evaluation target learner is 30, the ratio of the current grade to the lowest grade with respect to the difference between the highest grade and the lowest grade corresponds to ⅙ (=(30−20)/(80−20)). Thus, the authentication point P2 is formed at a location away from the start point P11 by a length corresponding to ⅙ of the total length of the authentication path P1.

As a result, the authentication path P1 has the grade distribution of all learners as one line.

Only when the drag operation is performed along the authentication path P1, the access to the evaluation result unit is successfully performed.

Then, when the drag operation is stopped at the authentication point P2, an effect of gradually filling the inside of the authentication point P2 may be outputted, and the drag operation may be resumed only after the authentication point P2 is completely filled. When the inside of the authentication point P2 is not filled or excessively filled, the authentication path P1 disappears.

As the authentication path P1 disappears when the inside of the authentication point P2 is not filled or excessively filled, the access to the evaluation result unit may be successfully performed only when the inside of the authentication point P2 is accurately filled.

As described above, the location at which the authentication point P2 is formed may be formed where the current grade is located on the authentication path P1 having the grade distribution of all the learners as one line, such that the evaluation target learner can intuitively recognize his/her grade while the authentication point P2 is filled, which makes it possible to significantly help the evaluation target learner to have a learning motivation.

While various embodiments have been described above, it will be understood to those skilled in the art that the embodiments described are by way of example only. Accordingly, the disclosure described herein should not be limited based on the described embodiments.

What is claimed is:

1. A robot control system for coding education, comprising:
    a robot configured to move according to a tangible block including a command, and having a plurality of motors therein;
    a control unit configured to independently control the plurality of motors;
    a tile board corresponding to the space in which the robot moves; and
    a block recognition unit configured to recognize the tangible block and extract the command,
    wherein the block recognition unit comprises a block recognition algorithm for reading order information in which the tangible block is placed,
    wherein the block recognition algorithm comprises:
    an image acquisition step of acquiring an image of the tangible block;
    a storage step of storing the image acquired in the image acquisition step;
    a 2D information extraction step of extracting 2D information of the stored image;
    a coordinate setting step of setting an orientation coordinate and setting a coordinate in the 2D information based on the orientation coordinate;
    an order information acquisition step of acquiring the order information according to the set coordinate; and
    a placement step of placing the tangible block on an AR (Augmented Reality) environment according to the order information.

2. The robot control system of claim 1, wherein the block recognition algorithm further comprises an allocation step of allocating not-placed blocks after the placement step, when the not-placed blocks are present.

3. The robot control system of claim 2, wherein the allocation step includes an average height calculation step of calculating the average height of the tangible blocks and a sorting step of sorting subaverage blocks having a smaller height than the average height, among the non-placed blocks.

4. The robot control system of claim 1, wherein the command block has an OpenCV-based marker on the top surface thereof,
    wherein the block recognition unit comprises a corner recognition module configured to recognize a corner of the marker.

5. The robot control system of claim 1, wherein the control unit comprises a line detection unit configured to detect a line of the tile board in order to check whether the robot moves according to the tangible block,
    wherein the line detection unit comprises line information which is configured in a different manner depending on whether the line is present within a detection radius of the line detection unit.

6. The robot control system of claim 5, wherein the error ranges of forward movement and rotational movement of the robot satisfy the following equations:

$$Ed = \text{length of line detection unit} \times 2$$

$$E\theta = \arctan((\text{line width}/2)/\text{distance difference between front line detection unit and center line detection unit}))$$

wherein Ed represents the error range of the forward movement, and E$\theta$ represents the error range of the rotational movement.

* * * * *